US011841478B2

(12) United States Patent
Roux et al.

(10) Patent No.: US 11,841,478 B2
(45) Date of Patent: Dec. 12, 2023

(54) OPTICAL DETECTION IN ACCESS CONTROL SYSTEMS

(71) Applicant: CONDUENT BUSINESS SERVICES, LLC, Florham Park, NJ (US)

(72) Inventors: Pascal Roux, Chabeuil (FR); Roland Courtial, Le Pouzin (FR); Serge Vial-Tissot, Montelier (FR)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 382 days.

(21) Appl. No.: 16/814,405

(22) Filed: Mar. 10, 2020

(65) Prior Publication Data
US 2021/0141119 A1 May 13, 2021

(30) Foreign Application Priority Data
Nov. 13, 2019 (EP) .................................... 19290113

(51) Int. Cl.
*G01V 8/20* (2006.01)
*G08B 13/183* (2006.01)

(52) U.S. Cl.
CPC .............. *G01V 8/20* (2013.01); *G08B 13/183* (2013.01)

(58) Field of Classification Search
CPC ................................ G01V 8/20; G08B 13/183
USPC ........................................................ 250/221
See application file for complete search history.

(56) References Cited

U.S. PATENT DOCUMENTS

| 5,260,765 | A | * | 11/1993 | Hawkinson | G08B 17/103 |
| | | | | | 356/153 |
| 5,286,967 | A | * | 2/1994 | Bates | E05F 15/43 |
| | | | | | 250/221 |
| 2007/0069114 | A1 | * | 3/2007 | Clifton | F16P 3/144 |
| | | | | | 250/221 |
| 2011/0253884 | A1 | * | 10/2011 | Ottleben | G01V 8/20 |
| | | | | | 250/221 |
| 2012/0068055 | A1 | * | 3/2012 | Burger | G01V 8/20 |
| | | | | | 250/221 |

(Continued)

FOREIGN PATENT DOCUMENTS

| DE | 35 09 096 A1 | 9/1986 | |
| DE | 102006057878 A1 * | 4/2008 | ............... G01V 8/20 |

(Continued)

OTHER PUBLICATIONS

Extended European Search Report, EU 19290113.0, (dated May 18, 2020).

(Continued)

*Primary Examiner* — Thanh Luu
(74) *Attorney, Agent, or Firm* — Jones Robb, PLLC

(57) ABSTRACT

Detecting passengers traveling through a transit gate, includes transmitting a first beam from a first optical emitter on a side of the transit gate to a first plurality of optical receivers on an opposite side of the transit gate, and transmitting a second beam from a second optical emitter on the opposite side of the transit gate to a second plurality of optical receivers on the side of the transit gate in a direction opposite the direction of the first beam. Transmit intensities are adjusted based on learned patterns or drifts in the receive intensities of light beams. Detection times are reduced based on pairing additional optical receivers with a single optical emitter.

15 Claims, 7 Drawing Sheets

(56) References Cited

U.S. PATENT DOCUMENTS

| | | | |
|---|---|---|---|
| 2013/0141710 A1* | 6/2013 | Hayden | G01V 8/20 250/206 |
| 2014/0361149 A1* | 12/2014 | Meinherz | G01V 8/20 250/208.1 |
| 2016/0178794 A1* | 6/2016 | Rollins | G01V 8/20 250/205 |
| 2017/0315262 A1* | 11/2017 | Collins | B66B 13/26 |

FOREIGN PATENT DOCUMENTS

| | | |
|---|---|---|
| EP | 0 702 800 A1 | 3/1996 |
| EP | 1 617 030 A2 | 1/2006 |
| KR | 101082077 B1 | 10/2011 |

OTHER PUBLICATIONS

Unknown, "IR Sensor Module for Reflective Sensor, Light Barrier, and Fast Proximity Application—TSSP93038DF1PZA," Vishay Semiconductors @ www.vishay.com, Rev. 1.0, pp. 1-10, Doc. No. 01668x (Oct. 7, 2019).

Unknown, "High Speed Infrared Emitting Diodes, 940nm, Surface Emitter Technology," Vishay Semiconductors @www.vishay.com, Rev. 1.1, pp. 1-8, Doc. No. 84252 (Dec. 8, 2017).

* cited by examiner

OPTICAL DETECTION IN ACCESS CONTROL SYSTEMS

CROSS-REFERENCE TO RELATED APPLICATIONS

This application claims priority to European Application No. 19290113.0, filed Nov. 13, 2019, which is incorporated by reference herein in its entirety.

TECHNICAL FIELD

Aspects of the present disclosure relate to access barriers configured to control access to reserved areas.

BACKGROUND

Access control systems are used to restrict access to various locations. For example, in public transit stations, access to a platform or other controlled area is restricted to holders of a valid ticket or otherwise authorized persons. Access control systems including access gates may require a user to traverse a passage selectively closed by barriers incorporated within such access gates. Such access gates can be of various shapes, sizes, and configurations, and examples of barriers within access gates can include turnstiles, gates, drop arms, etc. Thus, access gates can be configured with various sensors, such as optical sensors, to detect movement of passengers, vehicles, or objects through the access gate, and to open or close barriers coupled thereto.

However, current configurations of access gates with optical sensors suffer from issues related to intensity of light fluctuating, wear and tear of components (e.g. optical emitters and optical receivers), and speed of detection. Further, improving the resolution/speed of detection requires incorporating additional optical components in these gates, which makes manufacture and operation of these access gates less efficient and more expensive. Moreover, replacing additional optical components due to wear and tear is also inefficient for these reasons.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with at least one exemplary embodiment, an access gate for detecting movement through the access gate includes a first optical emitter provided on a first side of the access gate, wherein the first optical emitter is configured to transmit a first beam of light in a direction perpendicular to a direction of movement through the access gate, and a first plurality of optical receivers provided on a second side of the access gate, wherein each of the first plurality of optical receivers is configured to detect when the first beam of light is received at each of the first plurality of receivers, and wherein an angle of the first beam of light emitted from the first optical emitter is sufficiently wide for each of the first plurality of optical receivers to receive the beam of light when a path of the beam of light is uninterrupted.

In accordance with another exemplary embodiment, a system for access control includes a first access gate comprising a first side and a second side, a first plurality of optical emitters located on the first side of the first access gate and configured to respectively transmit a first plurality of light beams to a first plurality of optical receivers on the second side of the first access gate, wherein the first plurality of optical receivers is greater than the first plurality of optical emitters, and a second plurality of optical emitters located on the second side of the first access gate and configured to respectively transmit a second plurality of light beams to a second plurality of optical receivers on the first side of the first access gate, wherein the second plurality of optical receivers is greater than the second plurality of optical emitters.

In accordance with another exemplary embodiment, a method for detecting passengers traveling through a transit gate includes transmitting a first beam from a first optical emitter on a side of the transit gate to a first plurality of optical receivers on an opposite side of the transit gate, wherein the first beam is transmitted in a direction substantially perpendicular to a direction of travel of the passengers traveling through the transit gate, transmitting a second beam from a second optical emitter on the opposite side of the transit gate to a second plurality of optical receivers on the side of the transit gate in a direction opposite the direction of the first beam, and detecting a location of a passenger in the transit gate based on reception of the first and second beams relatively at the first and second pluralities of optical receivers.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present teachings and together with the description serve to explain certain principles and operation.

DETAILED DESCRIPTION

Figure 1:
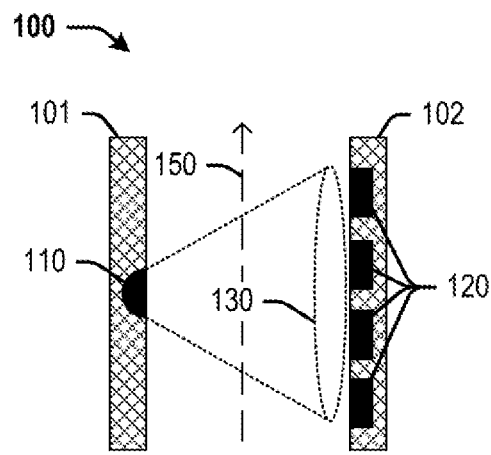
FIG. 1 is a top view of an exemplary access gate comprising one optical emitter and a plurality of optical receivers.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the disclosure or claims. For example, spatially relative terms—such as "beneath," "below," "lower," "above," "upper," "proximal," "distal," and the like—may be used to describe one element's or feature's relationship to another element or feature as illustrated in the orientation of the figures. These spatially relative terms are intended to encompass different positions (i.e., locations) and orientations (i.e., rotational placements) of a device in use or operation in addition to the position and orientation shown in the figures. For example, if a device in the figures is inverted, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

The present disclosure contemplates access control systems and access gates that use non-parallel or oblique light beams emitted from a first side of the described access gates and received at an opposite side of the access gate. Optical emitters and receivers may be disposed on both sides of the access gates, such that the oblique light beams are transmitted both directions, with both directions being substantially perpendicular to a direction of movement through the gate (e.g. movement of a passenger, vehicle, etc.). In exemplary embodiments described herein, each optical emitter faces a plurality of receivers (e.g. four receivers), and all receivers on one side are regularly spaced. Providing a greater number of optical receivers than optical emitters allows for a faster polling cycle using fewer optical components, as during each optical emitter's active period, multiple beams can be simultaneously assessed (by each of the plurality of optical receivers that receive a single light beam). This faster cycle reduces the detection time to close the gate or not, therefore improving security of passengers and/or vehicles moving through the access gate, and limiting the potential for fraud caused by multiple entities attempting to tailgate or gain unauthorized access by following an authorized person/vehicle. Exemplary optical emitters described herein are configured to emit an oblique light beam that spreads at an angle (or "spread angle") thereby enabling the light beam to be received at multiple receptors. For example, wide-angle optical emitters and receivers can be incorporated into the exemplary access gates, with varying spread angles as further described below. Such light beams enable coverage over areas where minimal components can be located (such as turnstile mechanisms or door openings), and can include coverage of regions that may otherwise be unable to receive light due to variations in terrain, landscape, and so on. Further, as described herein, accuracy and redundancy (due to failure of components) is improved with wide-angle light beams.

Further, providing optical emitters on both sides of access gates (as described in the exemplary access gates presented herein) ensures greater accuracy for detection of light beams in either direction, due to providing redundancy from variations in different components, and resistance to variations in ambient light levels and/or noise or interference from other optical emitters (including optical emitters within the same access gate or within adjacent access gates). Further, this accuracy is improved without adding additional optical components, and potentially by using fewer optical components, as described above. Further, the resolution is increased by using multiple optical emitters emitting light beams in opposite directions. Further, maintenance is simplified, as replacement optical components (including printed circuit boards, similar or functionally equivalent emitters and receivers, and software) can be used for both sides. In addition, using similar optical components can be leveraged to automatically address each optical component, so that replacing a component ensures that the same address is used for each component in the same location. For example, each printed circuit board (PCB) comprising optical components is paired with a resistor in series, such that the voltage across each PCB is slightly different. Thus, based on their electrical position in the chain in the circuit, the address of each PCB remains the same, which avoids the need for programming new addresses when components are installed or exchanged.

Further, each optical emitter is driven at a different time (e.g. alternately on using different phases), to avoid interference between optical emitters. For example, within a single transit gate with optical emitters and receivers on both sides, the optical emitters on either side are configured to transmit light beams at different times, to avoid or minimize interference between the optical emitters on either side. In another exemplary embodiment, the access gate is one among a plurality of access gates that are positioned adjacent each other. For example, the access gate may comprise a transit gate (such as a turnstile) for a public transit system or any other secure facility. In the event that a light beam from one transit gate can cause interference with a light beam from an adjacent access gate, or cause detection errors by reaching optical receivers of an adjacent access gate, then the timing of transmissions can be adjusted to minimize these effects. For example, optical emitters of a first access gate may be configured to use a cycle period of light beam transmission that is slightly offset from a cycle period of an adjacent access gate, such that alternating cycles (of each access gate) are free from interference caused by adjacent access gates. Further, as described herein, the intensity of light emitted by each optical emitter in a first access gate can be adjusted based on signals generated at the optical receiver that receives the light beam from the optical emitter.

In addition to adjusting based on undesired inter-gate effects, the transmit intensity in each optical emitter can be configurable to compensate for environmental and systemic variations, and allow better detection performance. The transmit intensity can be adjusted automatically based on monitoring variations in a receive intensity of each light beam of the transit gate. For example, in an exemplary embodiment, access gates can include a module configured to monitor a received intensity in each optical receiver and correlate variations or fluctuations in the receive intensity with the transmit intensity of each optical emitter, as well as to compensate for variations in received light caused by optical components and other components of the access gate, including protective barriers (such as glass, plexiglass, etc.) and the aforementioned environmental and systemic variations, including parasitic reflections. Ongoing or periodic self-learning regularly allows compensating for fluctuations and/or drifts in the received light energy due to aging and wear and tear of components, including optical emitters, receivers, and other components. It also allows preventive maintenance before the optical components are rendered insufficient for proper operation. For example, if the intensity of received light drifts past a one or more threshold values, then a current level of optical emitters can be adjusted, or an alert may be generated to diagnose or repair a component.

Referring now to FIG. 1, a top view of an exemplary access gate 100 is shown. The access gate 100 may be part of an access control system as further described herein, and includes at least a first side 101 and a second side 102. Sides 101 and 102 can be arranged to form a passageway through which a passenger or vehicle may move in a direction 150. Access gate 100 further includes a plurality of optical components, including optical emitter 110 and optical receivers 120. Optical emitter 110 can be configured to transmit a light beam 130 in a direction perpendicular to a direction of movement 150, and optical receivers 120 are configured to detect when the light beam 130 is received, and/or to determine based on whether or not light beam 130 is received, that a person, vehicle, or object is passing through access gate 100. An angle of the light beam 130 emitted from the optical emitter 110 is sufficiently wide for each optical receiver 120 to receive the light beam 130 when a path of light beam 130 is uninterrupted. In other words, light beam 130 is an oblique light beam having a spread angle sufficient to reach each optical receiver 120, with various ranges of spread angles being further provided herein. Further, for the purposes of this disclosure, the term "perpendicular" includes light beams that are substantially perpendicular to the direction of movement 150, particularly since oblique light beams are generally not considered as parallel light beams, and different transmission angles may be used depending on arrangement of optical components on opposite sides of the access gate 100.

Further, included within access gate 100 (but not shown herein) can be one or more access barriers preventing or enabling passengers and/or vehicles to move between sides 101 and 102. Thus, optical components 110 and 120 can be operably coupled with ticket validation equipment and one or more associated electronic controllers (e.g. processors) that are operably coupled with and coordinate operation of various actuators such as motors and/or other devices that operate (e.g., open and close) the one or more access barriers. Providing a greater number of optical receivers than optical emitters allows for a faster polling cycle using fewer optical components, as during an active period of optical emitter 110 (e.g. a time period during which light beam 130 is transmitted—the time period being approximately 1 ms of a 38 kHz beam of light), multiple signals can be simultaneously assessed (by each of the plurality of optical receivers 120 that receive single light beam 130). This faster cycle reduces the detection time to close a barrier or not, therefore improving security of passengers and/or vehicles moving through the access gate 100, and limiting the potential for fraud caused by multiple entities attempting to tailgate or gain unauthorized access by following an authorized person/vehicle. Although this exemplary embodiment (and others described below) illustrates four optical receivers per optical emitter, other ratios of receivers to emitters can be conceived of those having ordinary skill in the art, particularly when viewed in light of this disclosure. For example, multiple signal can be simultaneously assessed from two optical receivers receiving a single light beam or transmission. This can be useful in case a narrow-angle emitter is used, particularly for light beams that traverse longer distances (e.g. for wider access gates), or those having a relatively low resolution. On the other hand, a maximum number of optical receivers (e.g. a few tens) per single optical emitter may be limited based on a spread angle provided by the optical emitter (e.g. up to ±60°) and if a very high resolution is needed.

The access gate 100 can further include a module configured to adjust a transmit intensity of light beam 130 responsive to detecting variations in a receive intensity of light beam 130 as measured by optical receivers 120. For example, the variations can be caused by deteriorating components, including optical emitter 110, optical receivers 120, or other circuitry not shown herein. As described above, the variations may also be caused by environmental factors, such as reflections from other components of access gate 100 (like glass panels, barriers, etc.), ambient light and/or sunlight, other light beams from other optical emitters in adjacent access gates, and so on. In an exemplary embodiment, the variations are originally caused by an initial placement and/or configuration of optical and other components of access gate 100, and can be accounted for in adjusting the transmit intensity. Further, drifts in the intensity of received light can be monitored by the module periodically or on an ongoing basis, and used to adjust the transmit intensity of optical emitter 110 and to ensure reliable operation of access gate 100. In an exemplary embodiment, each optical receiver 120 is configured to generate an output corresponding to optical and/or infrared energy from receiving light beam 130. Further, the output is generated responsive to receiving a threshold amount of energy from receiving light beam 130. For example, when light beam 130 reaches a detection element of optical receiver 120, a current is generated in optical receiver 120. If the current meets a threshold value, then each optical receiver 120 is configured to provide an output signal. The output signal can be binary, i.e. a single positive value when a threshold amount of light (and/or energy associated therewith) is received, or a zero value when the amount of light/energy is below the threshold amount. Since the amount of light/energy is dependent on a current level used by optical emitter 110 to generate light beam 130, the binary output of optical receivers 120 can be indicative of fluctuations in the current of optical emitter 110. These fluctuations can be caused by various factors such as damage or deterioration of optical emitter 110 and/or components associated therewith, such as a PCB on which optical emitter 110 is provided.

Further, the current and/or transmit intensity of optical emitter 110 can be adjusted responsive to fluctuations in the output signal of optical receivers 120. Table 1 below shows exemplary current values for an optical emitter corresponding to generation of output signals for any of 4 optical receivers.

TABLE 1

| Step | Emitter current (mA) | Receiver 1 | Receiver 2 | Receiver 3 | Receiver 4 |
|---|---|---|---|---|---|
| 1 | 2.13 | 0 | 0 | 0 | 0 |
| 2 | 2.35 | 0 | 0 | 0 | 0 |
| 3 | 2.57 | 0 | 0 | 0 | 0 |
| 4 | 2.79 | 0 | 0 | 0 | 0 |
| 5 | 3.01 | 0 | 0 | 0 | 0 |
| 6 | 3.23 | 0 | 0 | 0 | 0 |
| 7 | 3.52 | 0 | 1 | 0 | 0 |
| 8 | 3.81 | 0 | 1 | 0 | 0 |
| 9 | 4.11 | 0 | 1 | 0 | 0 |
| 10 | 4.40 | 0 | 1 | 1 | 0 |
| 11 | 4.77 | 0 | 1 | 1 | 0 |
| 12 | 5.13 | 0 | 1 | 1 | 1 |
| 13 | 5.50 | 0 | 1 | 1 | 1 |
| 14 | 5.94 | 0 | 1 | 1 | 1 |
| 15 | 6.38 | 0 | 1 | 1 | 1 |
| 16 | 6.89 | 1 | 1 | 1 | 1 |
| 17 | 7.40 | 1 | 1 | 1 | 1 |
| 18 | 7.99 | 1 | 1 | 1 | 1 |
| 19 | 8.58 | 1 | 1 | 1 | 1 |
| 20 | 9.24 | 1 | 1 | 1 | 1 |
| 21 | 9.90 | 1 | 1 | 1 | 1 |
| 22 | 10.63 | 1 | 1 | 1 | 1 |
| 23 | 11.44 | 1 | 1 | 1 | 1 |
| 24 | 12.32 | 1 | 1 | 1 | 1 |
| 25 | 13.20 | 1 | 1 | 1 | 1 |
| 26 | 14.15 | 1 | 1 | 1 | 1 |
| 27 | 15.18 | 1 | 1 | 1 | 1 |
| 28 | 16.28 | 1 | 1 | 1 | 1 |
| 29 | 17.45 | 1 | 1 | 1 | 1 |
| 30 | 18.70 | 1 | 1 | 1 | 1 |
| 31 | 20.01 | 1 | 1 | 1 | 1 |
| 32 | 21.48 | 1 | 1 | 1 | 1 |

According to Table 1 above, a current of an optical emitter is increased in increments until the light beam generated therefrom is strong enough to activate different combinations of optical receivers. For example, a minimum current necessary for an optical emitter to provide a light beam sufficient to activate a single optical receiver is 3.52 mA (current step 7), and a minimum current necessary for an optical emitter to provide a light beam sufficient to activate four optical receivers is 6.89 mA (current step 16). Further, to ensure a safety margin and flexibility to allow for adjustments in both directions, the optical emitters can be configured to utilize a current of approximately 14.15 mA to generate the corresponding light beams. This value is selected from current step 26, which reflects 10 steps above the minimum necessary optical emitter's current to activate its corresponding 4 optical receivers. For example, as the current values follow a geometric progression (in series), a safety margin of 2 can be obtained by using the current that is 10 steps further in the series. This method of determining a current range for operation of optical emitters can be applied to any of the embodiments disclosed in this document, with the understanding that the values depicted above are merely exemplary, and may change depending on implementation, such as distance between optical elements and sides of the access gate, other components, ambient conditions, etc.

Further, the cause of the fluctuations can be determined based on a location within the access gate 100 where the fluctuations are detected. For example, if the output of a single optical receiver indicates a drift in receive intensity of light, then it is more likely that the PCB containing the optical receiver or a protective barrier of the optical receiver is damaged. Whereas, if the output of a plurality of adjacent receivers associated to one emitter detects a drift, it is more likely that the issue is in the optical emitter (or components associated therewith, including circuit components, PCBs, or protective barriers). Further, the drifts can be caused by degradation of the protective barriers due to passengers use or vandalism. Further, variations in output of optical receivers may be caused by production variation of the optical components, including variations in position that are caused during PCB manufacturing. In another example, if the adjustments reach another threshold, or if the drift exceeds or falls below one or more additional thresholds, then an alert may be generated. For example, the alert can be to replace or repair components, or manually adjust thresholds. For example, if a component is damaged or altered by vandals, the components can be repaired responsive to the alert.

Figure 8:
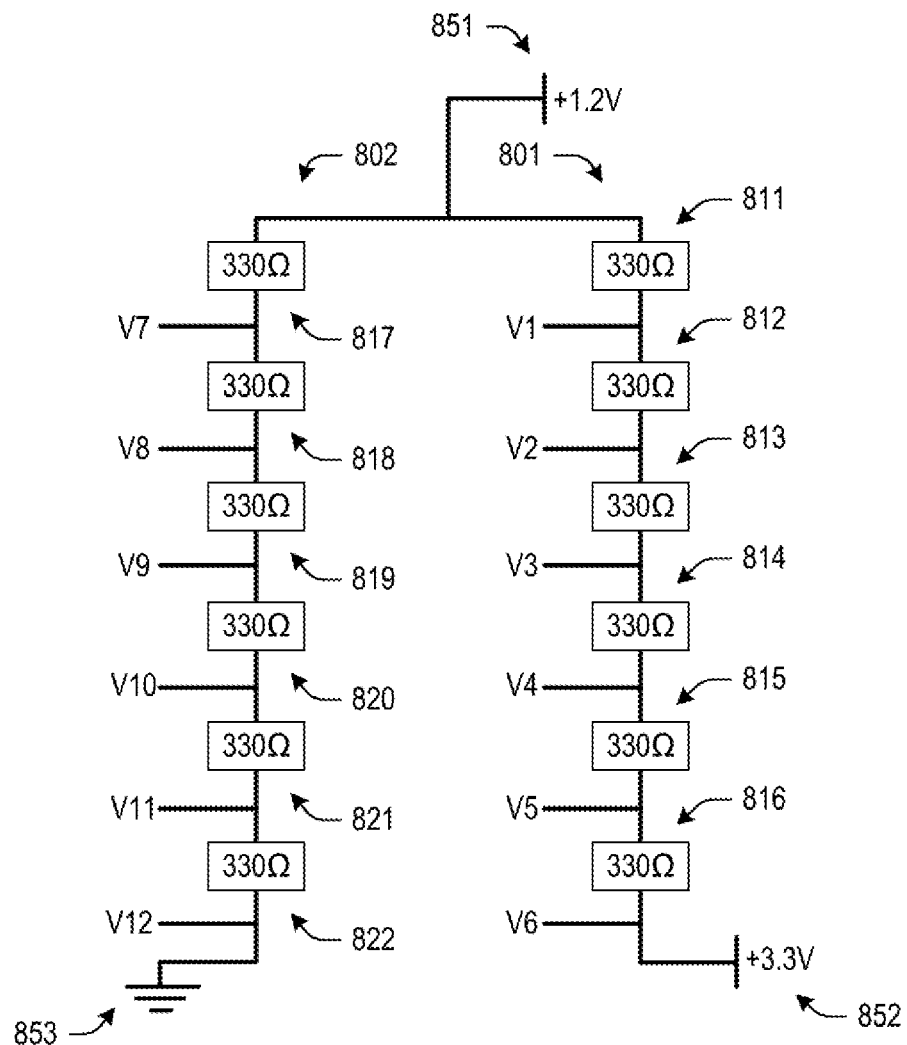
FIG. 8 illustrates an exemplary circuit depicting automatically-addressable PCBs.

Further, each optical component 110, 120 can be configured to have a fixed address. By virtue of using similar or functionally equivalent optical components, each optical component can be automatically addressed, so that replacing a component ensures that the same address is used for each component in the same location. For example, each printed circuit board (PCB) comprising optical components 110, 120 is paired with a resistor in series, such that the voltage across each PCB is slightly different. Thus, based on their electrical position in the chain in the circuit, the address of each PCB remains the same, which avoids the need for programming new addresses when components are installed or exchanged. FIG. 8 below describes an exemplary circuit with automatically-addressable PCBs.

Although FIG. 1 illustrates a single optical emitter and a plurality of corresponding optical receivers, it is to be understood that this depiction is merely exemplary to clearly show the concepts claimed herein, and actual access gates can be configured to utilize additional optical components while retaining the essential concept illustrated herein, i.e. of arranging a plurality of optical receivers to receive a single light beam from a single optical emitter. Similarly, the embodiments illustrated in FIGS. 2-3 below illustrate conceptual arrangements of optical components that may be multiplied or arranged in different configurations while retaining the conceptual features described herein.

Figure 2:
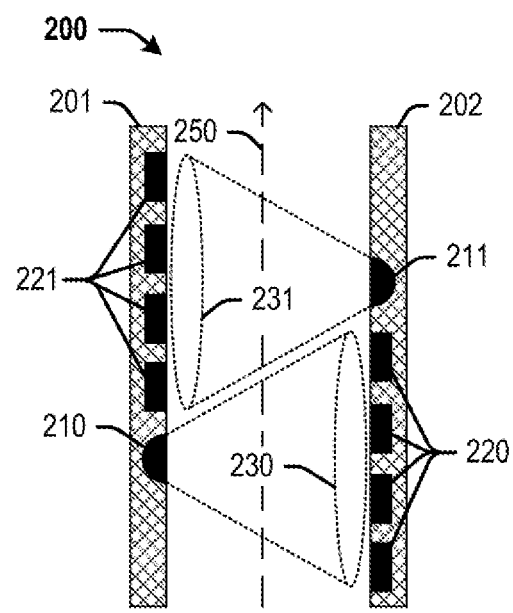
FIG. 2 is a top view of an exemplary access gate comprising two optical emitters and 2 corresponding pluralities of optical receivers.

Referring now to FIG. 2, a top view of an exemplary access gate 200 is shown. Similar to access gate 100, access gate 200 may be part of an access control system, and includes first side 201, second side 202, each of which is arranged to form a passageway through which a passenger, vehicle, or object may move in a direction 250. Further, optical emitter 210 can be configured to transmit a light beam 230 in a direction perpendicular to a direction of movement 250, and optical receivers 220 are configured to detect when the light beam 230 is received. In addition, a second optical emitter 211 is provided on the second side 202, and is configured to transmit a second beam of light 231 in a direction substantially opposite to that of the first beam of light 230. Second beam of light 231 is received by optical receivers 221 provided on the first side 201. For the purposes of this disclosure, the term "perpendicular" includes light beams that are substantially perpendicular to the direction of movement 250, particularly since oblique light beams are generally not considered as parallel light beams, and different transmission angles may be used depending on arrangement of optical components on opposite sides of the access gate 200. Further, the combination of optical receivers 220 and 221, along with any other circuitry (such as a module not shown herein) are configured to determine that a person, vehicle, or object is passing through access gate 200, based on reception of light beams 230 and 231. Further, an angle of each light beam 230, 231 is sufficiently wide for optical receivers 220, 221 to receive the light beam 230, 231. Further, light beams 230, 231 are illustrated as being separated to simplify the illustration, and it will be conceivable to those having ordinary skill in the art that there may be some amount of overlap between the light beams 230, 231, or any other combination of light beams described herein. See, for example, FIG. 5C, illustrating overlap of numerous light beams in opposite directions.

Further, in an exemplary embodiment, the first and second optical emitters 210, 211 are configured to emit the beams of light 230, 231 at different times, so as to avoid interference between optical emitters. The different times can be determined based on minimizing interference between the first and second optical emitters 210, 211. For example, in the event that light beam 230 can cause interference with light beam 231, or errors in detection at optical receivers 221, then the timing of transmissions can be adjusted to minimize these effects. For example, optical emitters 210, 211 may be configured to alternately transmit light beams or bursts of light beams that are separated from light beam transmissions from each other by a time period, such that alternating transmissions are free from interference caused by each other. Further, the intensity of light emitted by each optical emitter 210, 211 can be adjusted based on measured interference or other error detection methods.

In addition, transmit intensity of light beams 230, 231 can be adjusted responsive to detecting variations in an output of optical receivers 220, 221. For example, the variations can be caused by deteriorating components, including optical emitters 210, 211, optical receivers 220, 221 or other circuitry not shown herein. As described above, the variations may also be caused by environmental factors, such as reflections from other components of access gate 200 (like glass panels, barriers, etc.), ambient light and/or sunlight, other light beams from other optical emitters in adjacent access gates, and so on, with these components changing the received light intensity if they are damaged or deteriorated over time. The fluctuations can be monitored by the module periodically or on an ongoing basis, and used to adjust the transmit intensity of optical emitters 210, 211 to remain within one or more thresholds that ensure reliable operation of access gate 200. For example, output generated by each optical receiver 220, 221 can be monitored, and correlated with a threshold range of current for each optical emitter. Based on the output, the transmit intensity of optical emitters 210, 211 can be adjusted. Further, the thresholds may be adjusted responsive to ambient conditions, or age of the optical components 210, 211, 220, 221. Further, if the adjustments reach another threshold, or if the drift exceeds or falls below one or more additional thresholds, then an alert may be generated. For example, the alert can be to replace components, or manually adjust thresholds. Further, each optical component 210, 211, 220, 221 can be configured to have a fixed address. By virtue of using similar or functionally equivalent optical components, each optical component can be automatically addressed, so that replacing a component ensures that the same address is used for each component in the same location. For example, each printed circuit board (PCB) comprising optical components 210, 211, 220, 221 is paired with a resistor in series, such that the voltage across each PCB is slightly different. Thus, based on their electrical position in the chain in the circuit, the address of each PCB remains the same, which avoids the need for programming new addresses when components are installed or exchanged.

Further included within access gate 200 (but not shown herein) can be one or more access barriers preventing or enabling passengers and/or vehicles to move between sides 201 and 202. Thus, optical components 210, 211, 220, and 221 can be operably coupled with ticket validation equipment and one or more associated electronic controllers (e.g., processors) that are operably coupled with and coordinate operation of various actuators such as motors and/or other devices that operate (e.g., open and close) the one or more access barriers. Providing a greater number of optical receivers than optical emitters allows for a faster polling cycle using fewer optical components, as during an active period of optical emitters 210, 211 (e.g. a time period during which light beams 230, 231 are transmitted—the time period being approximately 1 ms of a 38 kHz beam of light), multiple signals can be simultaneously assessed (by each of the plurality of optical receivers 220, 221). This faster cycle reduces the detection time to close a barrier or not, therefore improving security of passengers and/or vehicles moving through the access gate 200, and limiting the potential for fraud caused by multiple entities attempting to tailgate or gain unauthorized access by following an authorized person/vehicle. In an exemplary embodiment, the detection time lies within a range of approximately 10 ms to approximately 1 s, with the lower end of the range useful for detecting fast-moving people or vehicles, and the upper end of the range useful for detecting slower movements such as disabled passengers, barriers in parking lots, etc. In general, reducing the detection time improves security of the access gate by enabling quicker opening/closing of an access barrier, and increasing the probability of detecting smaller objects/people that may be hidden between two adjacent or alternating beams during a time period that signals resulting from said beams are assessed. Conversely, adding additional optical emitters that transmit additional light beams may improve the resolution, but can degrade or lower detection time, whereas adding additional optical receivers without adding optical emitters improves both detection times and the resolution of detection.

Thus, providing optical emitters on both sides 201, 202 ensures greater accuracy for detection of light beams 230, 231 in either direction, due to resistance to variations in ambient light levels and/or noise or interference from other optical emitters (including optical emitters within the same access gate 200 or within adjacent access gates). Further, this accuracy is improved without adding additional optical components, and potentially by using fewer optical components, as described above. Further, the resolution is increased by using multiple optical emitters emitting light beams in opposite directions. Further, maintenance is simplified, as similar or functionally equivalent optical components (including printed circuit boards, emitters, receivers, and software) can be used for both sides.

Figure 3A:
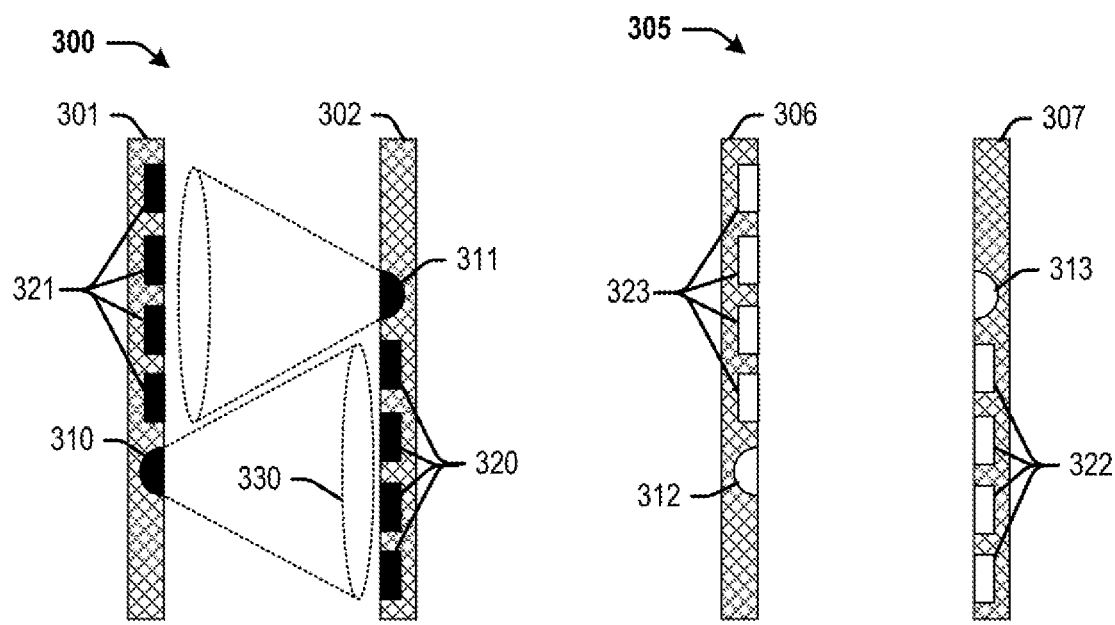
FIGS. 3A-3B are top views of two adjacent access gates.
Figure 3B:
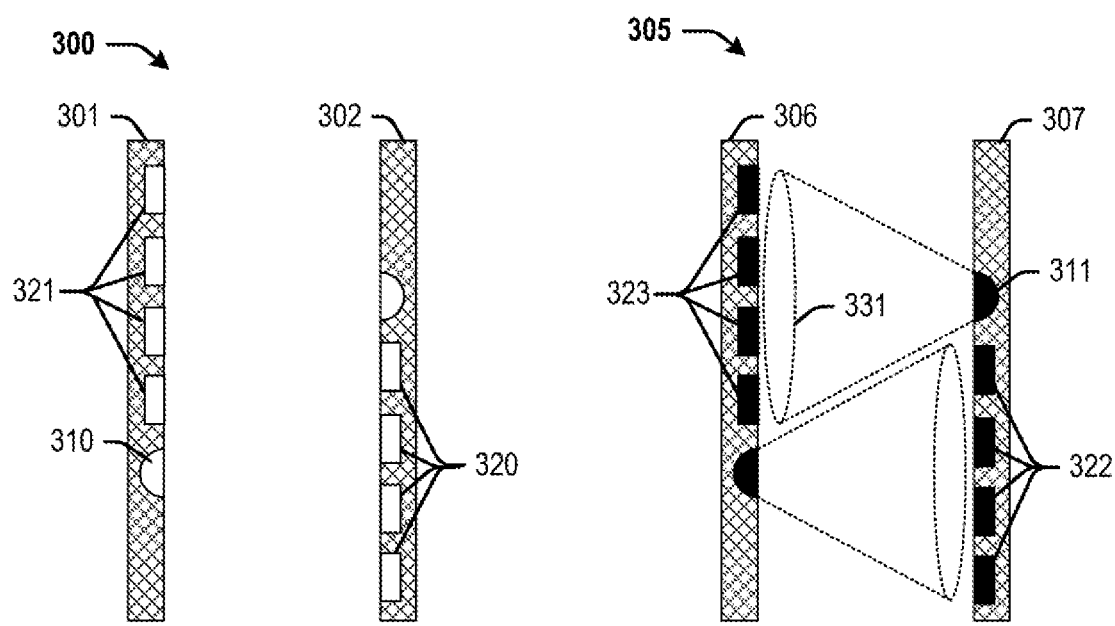

Referring now to FIGS. 3A and 3B, top views of exemplary access gates 300 and 305 are shown. Similar to access gates 100 and 200, access gates 300 and 305 may be part of an access control system, and placed adjacent to each other. For example, access gates 300, 305 may include transit gates in a public transit system, such as a metro station. Access gate 300 includes first side 301, second side 302, optical emitters 310, 311, and optical receivers 320, 321, with the functionality similar as described with regards to access gate 200. Similarly, access gate 305 includes first side 306, second side 307, optical emitters 312, 313, and optical receivers 322, 323. Further, similar to access gate 200, optical emitters 310, 311, and 312, 313 are configured to emit the beams of light at different times, so as to avoid interference between optical emitters of the same gate. Moreover, the transmit intensity of each optical emitter can be adjusted responsive to detecting variations in a receive intensity as measured by optical receivers 320, 321, 322, 323.

Further, the emitters 310, 311 in the first access gate 300 are configured to utilize a different transmission cycle than the emitters 312, 313 in the second access gate. For example, with reference to FIG. 3A, light beam 330 from access gate 300 can cause interference or detection errors to optical receivers 322, 323 in access gate 305. Thus, the timing of transmissions can be adjusted to minimize these effects. For example, optical emitters 310 and 311 are configured to transmit their respective light beams during a time that is offset from optical emitters 312 and 313, such that when optical emitters 310 and 311 are activated (for example, for a 1 ms time period), optical emitters 312 and 313 are not activated. Conversely, with reference to FIG. 3B, light beam 331 from access gate 305 can cause interference or detection errors to optical receivers 320, 321 in access gate 300. Thus, optical emitters 312 and 313 are configured to transmit their respective light beams during a time that is offset from optical emitters 310 and 311, such that when optical emitters 312 and 313 are activated (for example, for a 1 ms time period), optical emitters 310 and 311 are not activated, such that alternating cycles (of each transit gate 300, 305) are free from interference caused by the adjacent transit gates. Similarly, the intensity of light emitted by each optical emitter 310, 311, 312, 313 can be adjusted based on interference caused by light beams from adjacent gates.

Further, providing optical emitters on both sides 301, 302 ensures greater accuracy for detection of light beams in either direction, due to resistance to variations in ambient light levels and/or noise or interference from other optical emitters (including optical emitters within the same access gate 300 or within adjacent access gates). Further, this accuracy is improved without adding additional optical components, and potentially by using fewer optical components, as described above. Further, the resolution is increased by using multiple optical emitters emitting light beams in opposite directions. Further, maintenance is simplified, as similar or functionally equivalent optical components (including printed circuit boards, emitters, receivers, and software) can be used for both sides.

Although the above embodiments have illustrated exemplary access gates with 1 and 2 optical emitters (with corresponding 4 optical receivers per optical emitter), other configurations are possible. For example, an exemplary access gate can include (in addition to first and second emitters and corresponding plurality of receivers) a third optical emitter on a first side, a third plurality of receivers on the second side to receive a third beam of light from the third optical emitter, a fourth optical emitter on the second side, and a fourth plurality of receivers on the first side to receive a fourth beam of light from the fourth optical emitter. In this embodiment, similar to the above embodiments, the first and third optical emitters are configured to respectively transmit the first and third beams of light simultaneously and at a different time than the second and fourth optical emitters respectively transmitting the second and fourth beams of light. Further, this exemplary access gate can include the self-learning module, automatic addressing features, and other features described with respect to the above embodiments. For example, each of the aforementioned (and described-below) embodiments can be configured to adjusted the current used by the optical emitters responsive to fluctuations in the output signal of the optical receivers, similarly to the adjustment described in the embodiment of FIG. 1.

In another exemplary embodiment, an access gate can include (in addition to the first, second, third, and fourth optical emitters and corresponding pluralities of optical receivers) a fifth optical emitter on the first side, a fifth plurality of receivers on the second side to receive a fifth beam of light from the fifth optical emitter, a sixth optical emitter on the second side, a sixth plurality of receivers on the first side to receive a sixth beam of light from the sixth optical emitter, a seventh optical emitter on the first side, a seventh plurality of receivers on the second side to receive a seventh beam of light from the seventh optical emitter, an eighth optical emitter on the second side, and an eighth plurality of receivers on the first side to receive an eighth beam of light from the eighth optical emitter. The first, third, fifth, and seventh optical emitters on the first side are configured to transmit their respective beams of light at a different time than the second, fourth, sixth, and eighth optical emitters. In other words, the optical emitters on the first side transmit alternately with the optical emitters on the second side, so as to minimize interference between the first and second sides. For example, the optical emitters are configured to operate in different phases and combinations, so as to prevent interference caused to optical receivers within the same access gate.

Further, this exemplary access gate can include the self-learning module, automatic addressing features, and other features described with respect to the above embodiments. In each of these embodiments, the term "alternately" can include different sets of optical emitters transmitting at different times. For example, if the first, third, fifth, and seventh optical emitters on the first side are configured to transmit their light beams "alternately" with the optical emitters on the opposite side, this can also mean that the first and fifth optical emitters are configured to transmit their respective light beams at a different time than the third and seventh optical emitters. Other combinations and/or pairs of optical emitters can be activated at various different times, depending on the spacing between optical emitters, and which light beams may cause interference with which other light beams, whether pointing in approximately the same or roughly the opposite directions.

Referring now to FIGS. 4A-4D, top views of an exemplary access gate are shown with optical emitters operating in different phases so as to prevent interference being caused to optical receivers within the same access gate. The illustrated access gate comprises a left side 401 and 406, and a right side 402 and 407, with a gap 405 between each left side and each right side. The gap 405 may include other components, such as an access barrier, or vertical members (as further described in FIGS. 5A-5C). Moreover, each side includes 8 optical emitters and 32 optical receivers. In an exemplary embodiment, each optical emitter is housed on a printed circuit board (PCB), and optical emitters on sides 401, 406 are similar or functionally equivalent as optical emitters on sides 402, 407, except they are installed in a different orientation enabling transmission of light beams in opposite directions. Further in an exemplary embodiment, the optical receivers are spaced 48 mm apart, and the optical emitters are spaced 192 mm apart. These beams provide 24 mm detection accuracy in the center of the path between the sides 401, 402 and 406, 407. In this exemplary embodiment, a 48 mm spacing provides a 24 mm resolution in the center of the path between the sides, and in order to detect thinner objects (e.g. a 10 mm trolley handle or a finger), the optical receivers could be spaced 20 mm apart. Alternatively, to detect an arm and thicker parts of a body, the optical receivers could be spaced about 100 mm apart, or wider to detect wider objects such as vehicles. Given the 48 mm spacing, the resolution in the center is 24 mm, but the resolution is generally higher near the emitters, and generally lower near the receivers. Further, although all 16 optical emitters (8 on each side) can be activated, the optical emitters are activated using an alternating cycle, as illustrated in each of FIGS. 4A-4D. For example, the optical emitters are configured to emit the beams of light at different times, so as to avoid interference between optical emitters, or errors in detection at the optical receivers.

Figure 4A:
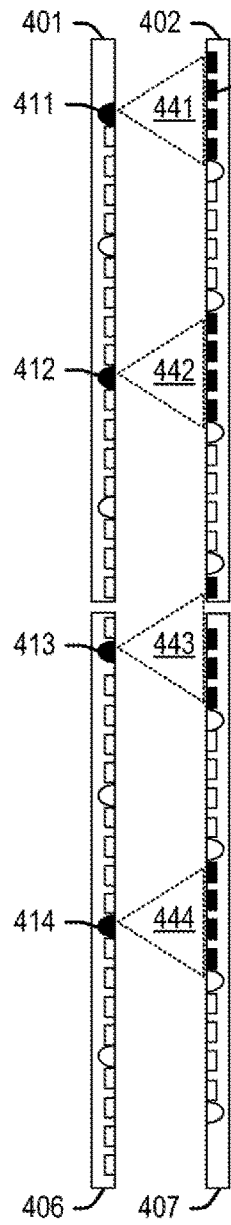
FIGS. 4A-4D are top views of different phases of an exemplary access gate comprising a plurality of optical emitters and corresponding pluralities of optical receivers.
Figure 4B:
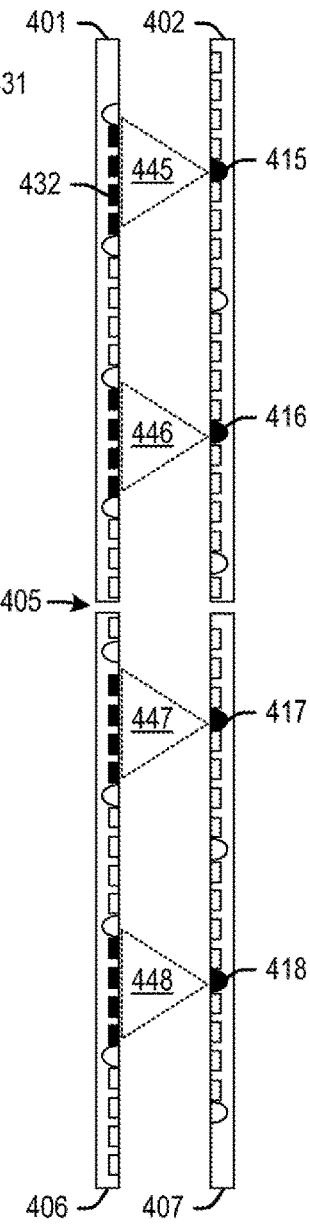
Figure 4C:
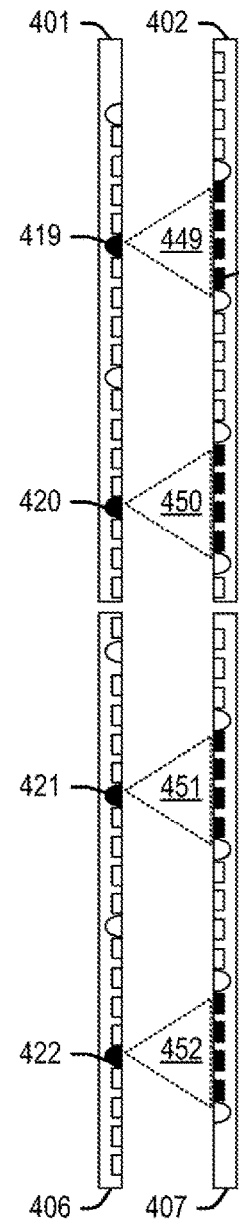
Figure 4D:
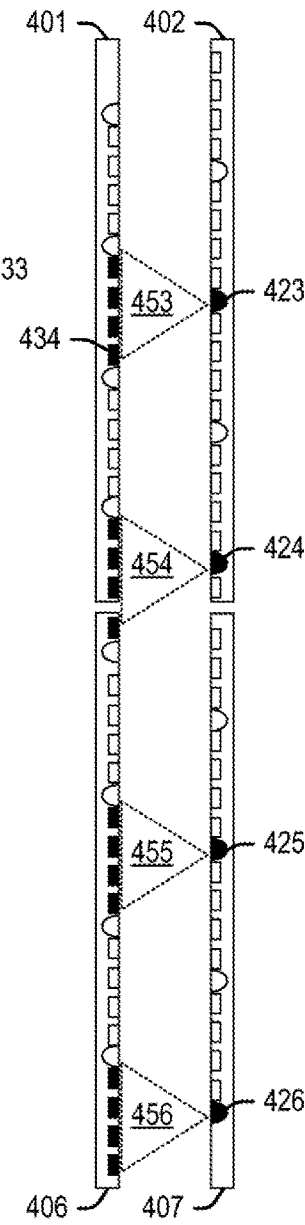

With reference to FIG. 4A, optical emitters 411, 412, 413, and 414 are configured to respectively transmit light beams 441, 442, 443, and 444, each of which is received by a plurality of optical receivers, such as optical receivers 431. Further, with reference to FIG. 4B, optical emitters 415, 416, 417, and 418 are configured to respectively transmit light beams 445, 446, 447, and 448, each of which is received by a plurality of optical receivers, such as optical receivers 432. Further, with reference to FIG. 4C, optical emitters 419, 420, 421, and 422 are configured to respectively transmit light beams 449, 450, 451, and 452, each of which is received by a plurality of optical receivers, such as optical receivers 433. Finally, with reference to FIG. 4D, optical emitters 423, 424, 425, and 426 are configured to respectively transmit light beams 453, 454, 455, and 456, each of which is received by a plurality of optical receivers, such as optical receivers 434. An angle of each light beam 441-456 is sufficiently wide for each optical receiver 431-434 to receive the light beam when a path of light beam is uninterrupted. Providing a greater number of optical receivers than optical emitters allows for a faster polling cycle using fewer optical components, reduces the detection time to close a barrier or not (e.g. as provided within gap 405), therefore improving security of passengers and/or vehicles moving through the access gate, and limiting the potential for fraud caused by multiple entities attempting to tailgate or gain unauthorized access by following an authorized person/vehicle.

Further, the different times for each phase in FIGS. 4A-4D can be determined based on interference between the optical emitters and/or detection errors in the optical receivers, and the timing of transmissions can be adjusted to minimize these effects. Further, the intensity of light emitted by each optical emitter can be adjusted based on measured interference or other error detection methods as described herein. In addition, a transmit intensity of the light beams can be adjusted responsive to detecting variations in a receive intensity as measured by each optical receiver. In other words, the current used by the optical emitters can be adjusted responsive to fluctuations in the output signal of the optical receivers, similarly to the adjustment described in the embodiment of FIG. 1. Further in an exemplary embodiment, each light beam 441-456 is a 1 ms pulse of 38 kHz infrared light, and the time between each phase illustrated in each of FIGS. 4A-4C may be within the range of 30 ms-50 ms or configurable based on an application in which the access gates are used. Further, it may be checked that no light beam is received before an expected light beam burst, and if this is not the case (i.e. if an optical receiver is already indicating light reception prior to an emitter, this output signal cannot be trusted and, therefore, this output signal can be ignored as long as it does not confirm the absence of light before the light beam is transmitted.

Further, similar to the embodiments described above, providing optical emitters on either side ensures greater accuracy for detection of light beams traveling in opposite directions, due to resistance to variations in ambient light levels and/or noise or interference from other optical emitters (including optical emitters within the same access gate or within adjacent access gates). Further, this accuracy is improved without adding additional optical components, and potentially by using fewer optical components, as described above. Further, the resolution is increased by using multiple optical emitters emitting light beams in opposite directions. Further, maintenance is simplified, as similar or functionally equivalent optical components (including printed circuit boards, emitters, receivers, and software) can be used for both sides.

Figure 5A:
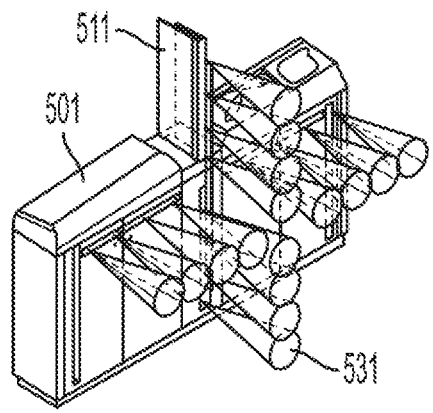
FIGS. 5A-5C are perspective views of an exemplary access gate.
Figure 5B:
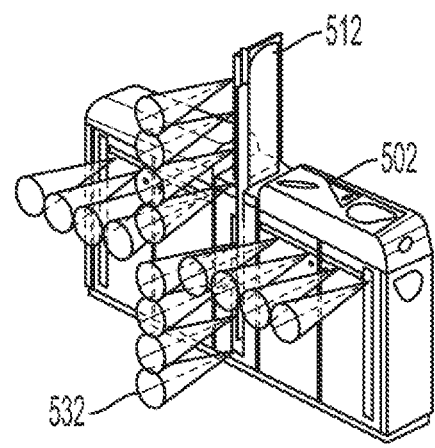
Figure 5C:
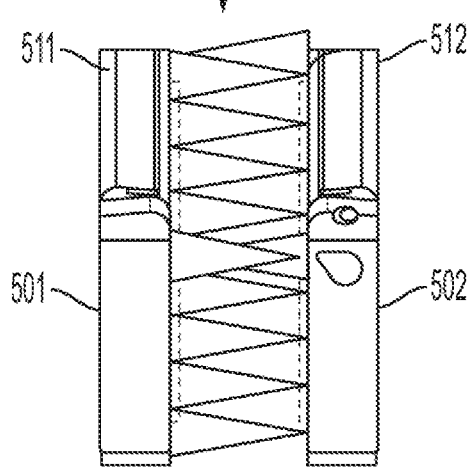

Referring now to FIGS. 5A-5C, perspective views of an exemplary transit gate are shown. With reference to FIG. 5A, a first side 501 of the transit gate is shown. The first side 501 is coupled to a vertical portion 511, which may comprise a housing for a barrier (such as a sliding door, turnstile, etc.), and a plurality of optical emitters and optical receivers are provided in both orientations, i.e. a first orientation of side 501 and a second orientation of vertical portion 511. The optical emitters disposed within side 501 and vertical portion 511 are configured to transmit a plurality of light beams 531. With reference to FIG. 5B, a second side 502 of the transit gate is shown. The second side 502 is coupled to a second vertical portion 512, which may comprise a housing for a barrier (such as a sliding door, turnstile, etc.), and a plurality of optical emitters and optical receivers are provided in both orientations, i.e. a first orientation of side 502 and a second orientation of vertical portion 512. The optical receivers disposed within side 502 and vertical portion 512 are configured to receive light beams 531 illustrated in FIG. 5A, and the optical emitters disposed within side 502 and vertical portion 512 are configured to transmit a plurality of light beams 532 that are correspondingly received by optical receivers in first side 501 and vertical portion 511.

Thus, with reference to FIG. 5C, a front view is shown of both sides 501, 502 of the transit gate. In this embodiment, the front view is from the perspective of entering the transit gate, and it is evident from this perspective that a full coverage of light beams 530 is provided, including overlapping regions in both horizontal and vertical orientations. When open, barriers may be housed within vertical portions 511, 512 and, when closed, the barriers may block passage between the two sides 501 and 502. Similar to the embodiments described above, a greater number of optical receivers is provided than optical emitters, allowing for a faster polling cycle using fewer optical components, reducing the detection time to open/close barriers, and limiting the potential for fraud caused by multiple entities attempting to tailgate or gain unauthorized access by following an authorized person/vehicle. Further, light beams 530 comprise oblique light beams that spread at an angle enabling the light beams to be received at multiple receptors, including coverage of areas where minimal components can be located (such as turnstile mechanisms or door openings. Further, each optical component can be automatically addressed as described above, and each optical emitter can be driven at different times or phase cycles to avoid interference between optical emitters on either side, detection errors by reaching optical receivers of an adjacent transit gate, etc. Further, as described herein, the intensity of light emitted by each optical emitter can be adjusted based on interference and can be configurable to compensate for environmental and systemic variations, and allow better detection performance. For example, the current used by the optical emitters can be adjusted responsive to fluctuations in the output signal of the optical receivers, similarly to the adjustment described in the embodiment of FIG. 1.

Figure 6:
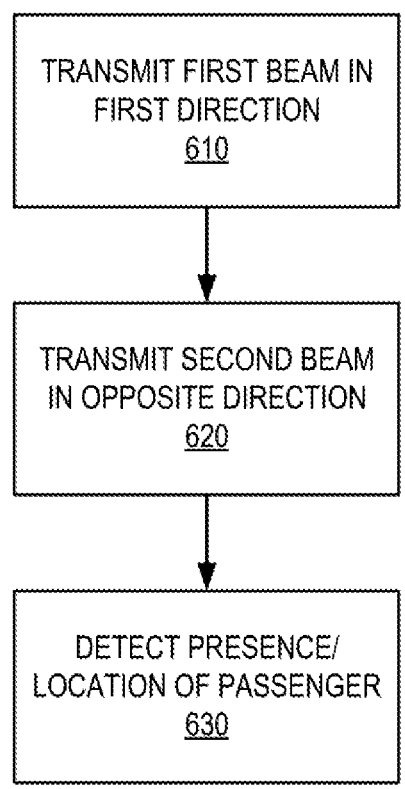
FIG. 6 is a flowchart of an exemplary method for access control.

FIG. 6 is a flowchart of an exemplary method for access control. The method of FIG. 6 is illustrated with respect to an access gate or a transit gate, such as those described in the aforementioned embodiments. In other embodiments, the method can be implemented with any suitable module that is communicatively coupled to such access gates or implemented within an access control system comprising one or more access control gates. Moreover, although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a first beam is transmitted in a first direction from one side of an access gate to an opposite side of the access gate. The sides can be arranged to form a passageway through which a passenger, vehicle, or object may move in a direction through the access gate, and the light beam may be transmitted by an optical emitter in a direction perpendicular to the direction of movement, with optical receivers on the opposite side being configured to detect when the light beam is received. In addition, at 620, a second optical emitter provided on the opposite is configured to transmit a second beam of light in a direction opposite to that of the first beam of light. The second beam of light is received by the optical receivers provided on the first side. Thus, at 630, the combination of the optical receivers (along with any other circuitry such as a module) are configured to determine that a person, vehicle, or object is passing through the access gate, based on reception of the two light beams.

Further, an angle of each light beam is sufficiently wide for the optical receivers to receive the light beam. Further, the opposite-facing optical emitters are configured to emit the beams of light at different times, so as to avoid interference between optical emitters. The different times can be determined based on interference between the first and second optical emitters. In other words, the optical emitters may be configured to use a cycle period of light beam transmission that different from each other, such that alternating cycles are free from interference caused by different light beams. Further, the intensity of light emitted by each optical emitter can be adjusted based on measured interference or other error detection methods. In addition, the transmit intensity of the light beams can be adjusted responsive to detecting variations in a receive intensity as measured by the optical receivers. For example, the current used by the optical emitters can be adjusted responsive to fluctuations in the output signal of the optical receivers, similarly to the adjustment described in the embodiment of FIG. 1.

Figure 7:
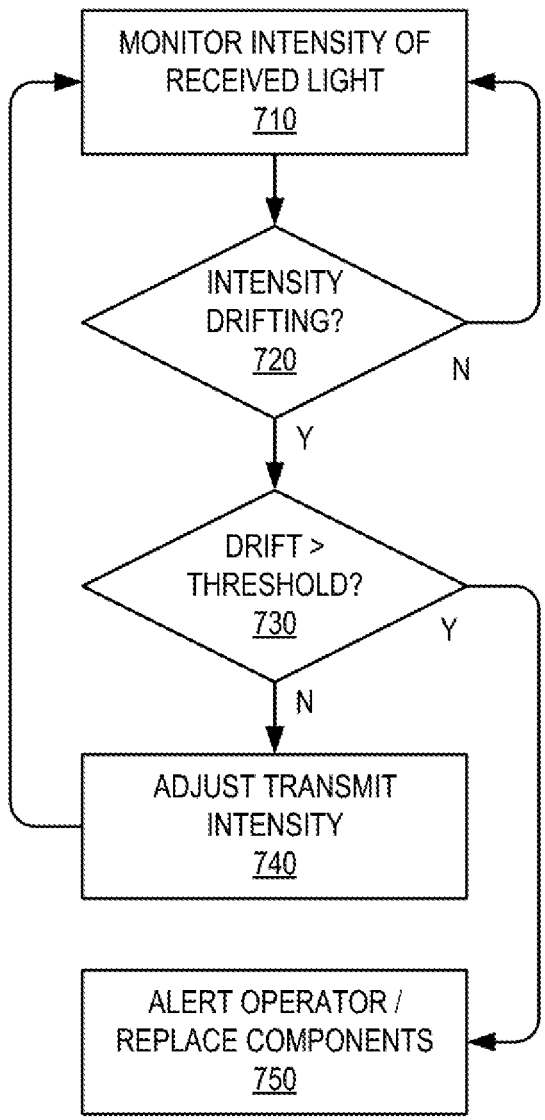
FIG. 7 is a flowchart of an exemplary method for adjusting a transmit intensity of a light beam.

FIG. 7 is a flowchart of an exemplary method for adjusting a transmit intensity of a light beam. The method of FIG. 7 is illustrated with respect to an access gate or a transit gate, such as those described in the aforementioned embodiments. In other embodiments, the method can be implemented with any suitable module that is communicatively coupled to such access gates or implemented within an access control system comprising one or more access control gates. Moreover, although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, the intensity of received light is monitored at one or more optical receivers of an access gate. For example, an access gate is configured with one or more optical emitters on a first side of the access gate and configured to transmit a light beam to a plurality of optical receivers on the opposite side of the access gate. The sides can be arranged to form a passageway through which a passenger, vehicle, or object may move in a direction through the access gate, and the light beam may be transmitted by an optical emitter in a direction perpendicular to the direction of movement, with optical receivers on the opposite side being configured to detect when the light beam is received. Any number and combination of optical components and light beams may be included in this embodiment, such as the numerous combinations described with reference to the above embodiments. Further, the variations can be caused by deteriorating components, including optical emitters, optical receivers, or other circuitry. As described above, the variations may also be caused by environmental factors, such as reflections from other components of the access gate (like glass panels, barriers, etc.), ambient light and/or sunlight, other light beams from other optical emitters in adjacent access gates, and so on. Output signals from each optical receiver can be monitored by the module periodically or on an ongoing basis and, if at 720, the intensity is drifting, then the transmit intensity of the optical emitters can be adjusted accordingly such that the received intensity remains within one or more thresholds that ensure reliable operation of the access gate. In other words, the current used by the optical emitters can be adjusted responsive to fluctuations in the output signal of the optical receivers, similarly to the adjustment described in the embodiment of FIG. 1. Further, at 730 if the intensity drift exceeds or falls below one or more additional thresholds, then an alert may be generated at 750. For example, the alert can be to replace components, or manually adjust thresholds.

Thus, the methods described above can also include transmitting the first and second beams at different times from each other, or transmitting the first and second beams at different times from other beams transmitted from adjacent transit gates.

FIG. 8 illustrates an exemplary circuit depicting automatically-addressable PCBs. In this embodiment, the circuit comprises a first side 801 and a second side 802, with first side 801 including PCBs 811-816, and second side 802 including PCBs 817-822. Although the components of the PCBs are not shown, it is to be understood that each PCB comprises one or more optical elements and any additional circuitry required to operate the one or more optical elements. Further, each PCB is paired with a 330 ohm (330Ω) resistor, and a voltage readout. Thus, PCB 811 is paired with a 330 ohm resistor and a voltage readout V1, PCB 812 is paired with an identical resistor and a voltage readout V2, and so on until PCB 822 paired with a resistor and a voltage readout V12. Further, PCBs 811-816 on first side 801 are provided a fixed voltage of +1.2V at a first terminal 851, and a voltage of +3.3V at a second terminal 852. In contrast, PCBs 817-822 on second side 802 are provided a fixed voltage of +1.2V at first terminal 851, and grounded at a third terminal 853. The different voltages between first side 801 and second side 802 ensure that each PCB has a unique address based on the voltage measured across each PCB. For example, while there is an average step of (3.3-1.2)/6=0.35V between any two adjacent PCBs on first side 801, there is an average step of 1.2/6=0.2V between any two adjacent PCBs on second side 802.

Pairing the PCBs with identical resistors in series ensures that voltages V1-V12 (associated with each PCB) will be unique and, thus, a voltage measurement can be associated with an address of each PCB (i.e. location of the PCB within the circuit). The voltage may be measured when the access gate is initially activated or powered up, upon which a microcontroller embedded within the PCB measures the voltage and determines the address of the PCB based on the voltage. In an exemplary embodiment, the determination can be performed by a controller that is communicably coupled to all PCBs 811-822. Thus, when a PCB is damaged or unresponsive, it can be removed, and the new PCB inserted into its place will also measure the same voltage and thereby ensure that the replacement PCB has the same address as the old/damaged PCB.

Further, although FIG. 8 shows a single +1.2V terminal shared by both sides 801, 802, other configurations are possible and may be evident to those having ordinary skill in the art in light of this disclosure. For example, if a single +3.3V terminal was used for all PCBs 811-812 (with both sides 801, 802 being connected in series and the opposite end connected to ground), then each PCB would have a unique address based on a voltage step of 3.3/12=0.275V per PCB. Alternatively, each side 801, 802 could be connected to an independent +1.2V terminal, which would reduce wiring and/or cable lengths between both sides. Further, similar to the embodiment of FIG. 1, a transmit intensity of the optical emitters can be adjusted responsive to detecting variations in a receive intensity of light beams as measured by the optical receivers. In other words, the current used by optical emitters can be adjusted responsive to fluctuations in the output signal of the optical receivers.

While the exemplary circuit of FIG. 8 shows 6 PCBs per side, it is conceivable to have a different number of PCBs depending on the design and dimensions of the access gate in which the PCBs will be implemented. Further, this addressing mechanism may be incorporated into any of the exemplary access gates described in FIGS. 1-5, in any combination of optical components, so long as the novel scope and spirit of the embodiment (e.g. uniquely addressable optical components based on pairing with resistors in series) is included in the combinations.

Optical components (including emitters and receivers) in each of the above-described exemplary embodiments may be selected with specifications that meet the requirements of the specific implementation or environment in which the access gates will be implemented. In an exemplary and non-limiting example, the above embodiments can include optical components such as emitters and receivers manufactured by Vishay Semiconductors®, including optical emitters VSMY2943RG and VSMY2943G (i.e. High Speed Infrared Emitting Diodes, 940 nm, Surface Emitter Technology), and optical receivers TSSP93038DF1PZA (IR Sensor Module for Reflective Sensor, Light Barrier, and Fast Proximity Applications). Alternatively or in addition, the optical emitters can include features such as surface mounts, wavelength of 940 mm, angle of half-intensity 28 degrees, and dimensions of approximately 2.3×2.3×2.55 mm. Further, the optical receivers can include features such as having PIN diode and sensor IC in one package, shielding against EMI, supply voltage of 2.0 V to 3.6 V, carrier frequency of 38 kHz, and active low output in response to infrared bursts of 940 nm. In an exemplary embodiment, the aforementioned optical emitters are configured to transmit optical transmissions in bursts comprising 15 to 20 cycles of 38 kHz each, with pauses in between each burst, such that the signals generated at the optical receivers are measurable, and there is no after-effect of a previously received signal. These values are exemplary, and can change if the optical receivers have different specifications that result in different detection speeds or signal outputs. Further in an exemplary embodiment, the choice of optical emitters that can transmit oblique light beams is based on numerous contributing factors including the light emitted (mW/sr) at nominal current, the emitter's reduction factor in the beam direction, the increased distance compared to a non-oblique beam (since intensity of light reduces with the square of the distance), the optical receiver's reduction factor in the beam direction, and the optical receiver's current for the nominal received light, among others. Based on these factors, the aforementioned VSMY2943 LED optical emitters (transmitting at ±28°) and the aforementioned TSSP93038 optical receivers (photodiode+integrated preamplifier receiving at ±45°) are included in the exemplary access gates described herein. Meanwhile, VSMY5940 LED optical transmitters (transmitting at ±60°) can also be used with oblique beams up to 30° with a good safety margin on the LED current.

While embodiments of the disclosure are described in connection public facilities such as rail, bus, or other transit facilities, embodiments of the disclosure can be used in any other circumstance in which access of individuals to a restricted area is to be controlled based on tickets, passes, tokens, or other forms of validation. Such other forms of validation could include numerical keypads, fingerprint scanners, retina scanners, voice pattern scanners, etc. Examples of other facilities in which access controls of the disclosure may be used include entertainment venues, sports venues, office buildings, airports, etc.

Further modifications and alternative embodiments will be apparent to those of ordinary skill in the art in view of the disclosure herein. For example, the devices, systems, and methods may include additional components or steps that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present disclosure and following claims.

It is to be understood that the particular examples and embodiments set forth herein are non-limiting, and modifications to structure, dimensions, materials, and methodologies may be made without departing from the scope of the present disclosure.

Other embodiments in accordance with the present disclosure will be apparent to those skilled in the art from consideration of the specification and practice of the invention disclosed herein. It is intended that the specification and examples be considered as exemplary only, with being entitled to their full breadth of scope, including equivalents by the following claims.

What is claimed is:

1. An access gate for detecting movement through the access gate, the access gate comprising:
   a first plurality of optical emitters provided on a first side of the access gate, wherein an optical emitter of the first plurality of optical emitters is configured to transmit a first beam of light in a direction perpendicular to a direction of movement through the access gate;
   a first plurality of optical receivers provided on a second side of the access gate, wherein each of the first plurality of optical receivers is configured to detect when the first beam of light is received at each of the first plurality of optical receivers;
   a second plurality of optical emitters provided on the second side of the access gate, wherein an optical emitter of the second plurality of optical emitters is configured to transmit a second beam of light in a direction opposite to that of the first beam of light;
   a second plurality of optical receivers provided on the first side of the access gate, wherein each of the second plurality of optical receivers is configured to detect when the second beam of light is received at each of the second plurality of optical receivers; and
   a module configured to monitor output signals from the optical receivers periodically or on an ongoing basis and, if an intensity of the monitored output signals is drifting and a drift is below a threshold, adjust a transmit intensity of the first and/or second beams of light emitted by a respective one of the first or second plurality of optical emitters and if the drift exceeds the threshold, generate an alert to replace components including at least one of the first or second plurality of optical emitters or at least one of the first or second plurality of optical receivers, or to manually adjust the threshold,
   wherein an angle of the first beam of light emitted from the optical emitter of the first plurality of optical emitters is sufficiently wide for each of the first plurality of optical receivers to receive the first beam of light when a path of the first beam of light is uninterrupted.

2. The access gate of claim 1, wherein the first plurality of optical emitters and the second plurality of optical emitters are configured to emit the first and second beams of light at different times.

3. The access gate of claim 2, wherein the different times are determined based on minimizing interference between the first and second plurality of optical emitters.

4. The access gate of claim 1, further comprising:
   a third optical emitter on the first side;
   a third plurality of receivers on the second side to receive a third beam of light from the third optical emitter;
   a fourth optical emitter on the second side; and
   a fourth plurality of receivers on the first side to receive a fourth beam of light from the fourth optical emitter,
   wherein the first plurality of optical emitters and the third optical emitter are configured to respectively transmit the first and third beams of light simultaneously and at a different time than the second plurality of optical emitters and the fourth optical emitter respectively transmitting the second and fourth beams of light.

5. The access gate of claim 4, further comprising:
   a fifth optical emitter on the first side;
   a fifth plurality of receivers on the second side to receive a fifth beam of light from the fifth optical emitter;
   a sixth optical emitter on the second side;
   a sixth plurality of receivers on the first side to receive a sixth beam of light from the sixth optical emitter;
   a seventh optical emitter on the first side;
   a seventh plurality of receivers on the second side to receive a seventh beam of light from the seventh optical emitter;
   an eighth optical emitter on the second side; and
   an eighth plurality of receivers on the first side to receive an eighth beam of light from the eighth optical emitter,
   wherein the first plurality of optical emitters and the third, fifth, and seventh optical emitters on the first side are configured to transmit their respective beams of light at a different time than the second plurality of optical emitters and the fourth, sixth, and eighth optical emitters.

6. The access gate of claim 1, wherein each optical emitter and optical receiver is configured to have a fixed address.

7. The access gate of claim 1, further comprising first and second vertical portions respectively coupled to the first and second sides, each vertical portion comprising a plurality of optical emitters and a corresponding plurality of optical receivers for each of the plurality of optical emitters.

8. The access gate of claim 1, wherein the first plurality of optical receivers is greater than the first plurality of optical emitters, and the second plurality of optical receivers is greater than the second plurality of optical emitters.

9. A system for access control, the system comprising:
   a first access gate comprising a first side and a second side;
   a first plurality of optical emitters located on the first side of the first access gate and configured to respectively transmit a first plurality of light beams to a first plurality of optical receivers on the second side of the first access gate, wherein the first plurality of optical receivers is greater than the first plurality of optical emitters;
   a second plurality of optical emitters located on the second side of the first access gate and configured to respectively transmit a second plurality of light beams to a second plurality of optical receivers on the first side of the first access gate, wherein the second plurality of optical receivers is greater than the second plurality of optical emitters;
   a module configured to monitor output signals from the first and second plurality of optical receivers periodically or on an ongoing basis and if an intensity of the monitored output signals is drifting and a drift is below a threshold, then adjust a transmit intensity of the first or second plurality of light beams from the first or second plurality of optical emitters and if the drift exceeds the threshold, generate an alert to replace components including at least one of the first and second plurality of optical emitters or the first and second plurality of optical receivers or to manually adjust the threshold.

10. The system of claim 9, wherein the first and second plurality of optical emitters are configured to alternately transmit their respective light beams.

11. The system of claim 9, wherein a spread angle of each light beam is sufficiently wide such that multiple optical receivers on one side can receive a single light beam transmitted from an opposite side.

12. The system of claim 9, further comprising a second access gate located adjacent to the first access gate, the second access gate comprising:
   a third plurality of optical emitters on a first side of the second access gate configured to transmit a third plurality of light beams to a third plurality of optical receivers on a second side of the second access gate, wherein the third plurality of optical receivers is greater than the third plurality of optical emitters; and
   a fourth plurality of optical emitters on the second side of the second access gate configured to transmit a fourth plurality of light beams to a fourth plurality of optical receivers on the first side of the second access gate, wherein the fourth plurality of optical receivers is greater than the fourth plurality of optical emitters.

13. The system of claim 12, wherein the first and second plurality of optical emitters in the first access gate are configured to utilize a different transmission cycle than the third and fourth plurality of optical emitters in the second access gate.

14. The system of claim 13, wherein the different transmission cycle of each respective optical emitter is adjusted to avoid reception of light beams from one access gate to the other.

15. A method for detecting passengers traveling through a transit gate, the method comprising:
   transmitting a first beam from a first optical emitter of a plurality of first optical emitters on a side of the transit gate to a first plurality of optical receivers on an opposite side of the transit gate, wherein the first beam is transmitted in a direction substantially perpendicular to a direction of travel of the passengers traveling through the transit gate, the first plurality of optical receivers being greater than the first plurality of optical emitters;
   transmitting a second beam from a second optical emitter of a second plurality of optical emitters on the opposite side of the transit gate to a second plurality of optical receivers on the side of the transit gate in a direction opposite the direction of the first beam, the second plurality of optical receivers being greater than the second plurality of optical emitters;
   detecting a location of a passenger in the transit gate based on reception of the first and second beams relatively at the first and second plurality of optical receivers; and
   monitoring output signals from the optical receivers periodically or on an ongoing basis and if an intensity of the monitored output signals is drifting and a drift is below a threshold, then adjusting a transmit intensity of the first or second beams of light from the first or second optical emitters and, if the drift exceeds the threshold, generating an alert to replace components including at least one of optical emitters or optical receivers or to manually adjust the threshold.

* * * * *